Figure 1:
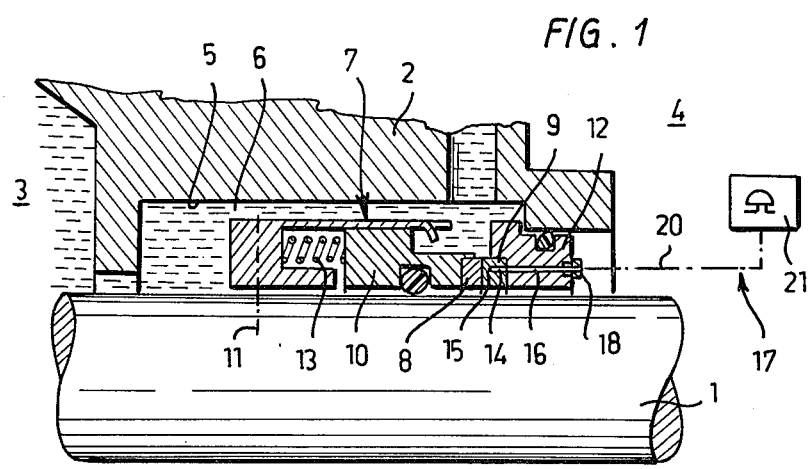

United States Patent [19]

Heilala

[11] 4,424,973
[45] Jan. 10, 1984

[54] SINGLE-ACTING SLIDE RING SEALING

[75] Inventor: Antti J. Heilala, Muurame, Finland

[73] Assignee: Oy Safematic Ltd., Muurame, Finland

[21] Appl. No.: 462,976

[22] Filed: Feb. 1, 1983

[30] Foreign Application Priority Data

Feb. 9, 1982 [FI] Finland ................................. 820409

[51] Int. Cl.³ .......................................... F16J 15/34
[52] U.S. Cl. .......................................... 277/2; 277/96.1
[58] Field of Search ....................... 277/2, 81 R, 96.1

[56] References Cited

U.S. PATENT DOCUMENTS

| | | | |
|---|---|---|---|
| 2,491,599 | 12/1949 | Allen | 277/2 |
| 3,749,411 | 7/1973 | Lennon | 277/2 |
| 3,815,925 | 6/1974 | Mattoon | 277/2 |
| 3,873,102 | 3/1975 | Lotze | 277/2 |

Primary Examiner—Robert I. Smith
Attorney, Agent, or Firm—Cushman, Darby & Cushman

[57] ABSTRACT

A single-acting slide sealing for a liquid pump or similar. The sealing comprises a rotating counter ring (8) to be fastened to a rotating machine part (2) and a non-rotating sealing ring (9) to be supported on a stationary machine part (1). The sliding surface in the counter ring is sealingly pressed against the sliding surface in the sealing ring. The sliding surface in the sealing ring (9) is provided with a weakened part (15) which, through a channel (14) in the sealing ring, is in flow connection with a leak indicator (17), such as an electrical or mechanical indicator instrument (21), which, when the weakened part is worn through, is activated by the action of liquid entering into the channel and in advance indicates that the sealing ring is worn and must be replaced.

6 Claims, 4 Drawing Figures

SINGLE-ACTING SLIDE RING SEALING

The present invention relates to a single-acting slide ring sealing comprising a counter ring to be fastened to a rotating machine part and having a first annular sliding surface, and a non-rotating sealing ring to be supported on a stationary machine part and having a second annular sliding surface which, in operation, is pressed against the sliding surface of said counter ring.

Slide ring sealings are used in pumps and similar for preventing the liquid to be pumped from leaking through the joint between the rotating machine part, for example, the shaft of a pump and the stationary machine part, for example, the housing of a pump.

There are two types of axially sealing slide ring sealings: Single-acting sealings are provided with two rings which rotate with respect to each other and of which one is fastened and sealed to a rotating machine part and the other is fastened and sealed to a stationary machine part. The sliding surfaces formed in the rings are sealingly pressed against each other. Double-acting sealings, in their simplest form, comprise two single-acting sealings. Into the space between said sealings is fed a separate sealing liquid which lubricates the sliding surfaces of the rings rotating with respect to each other.

In a single-acting slide ring sealing, on the other hand, the lubrication is exclusively carried out by the liquid to be pumped. For this reason it is not possible to use single-acting sealings for liquids containing mechanically abrasive particles, such as masses and slurries and various crystallizing solutions. The use of single-acting sealings is limited by the fact that the sealing, because of wearing of the sliding surfaces due to insufficient lubrication, starts to leak, probably in abundant quantities, without any advance warning. An abundant leak causes an extra process standstill. In order to avoid the costs caused by a standstill, users have often chosen for the locations which are important with respect to the process double-acting slide ring sealings, by means of which it is possible to run the process until the next scheduled process standstill.

Aims have been made to improve a single-acting slide ring sealing by providing at the outside of the sealing a pressureless liquid flushing, which is sealed radially on the shaft by means of a flexible secondary sealing. By means of a secondary sealing it is also possible to lengthen the lifetime of leaking sealing rings, but such an arrangement requires a separate flushing system and is in construction and costs nearly of the same order as a double-acting slide ring sealing.

The object of the present invention is to provide a slide ring sealing which eliminates the above mentioned disadvantages and which automatically, well in advance, indicates that the sealing is worn and will probably start to leak in the near future. This object is achieved by means of a sealing according to the invention which is characterized in that the sliding surface of the sealing ring is provided with at least one part weaker than the rest of the sliding surface, and in that the sealing ring is provided with a closed channel which is separated by said weaker part from the sliding surface and which communicates with a leak indicator acting by means of the liquid to be sealed.

The invention is based on the idea of providing the slide ring sealing with a weakened part which is worn through before the sliding surfaces of the rings are worn to such an extent that the sealing starts to leak to a harmful extent. After said weakened part is worn through liquid is able to drip through said weakened part and through the channel into the leak indicator so that, outside the sealing, a noticeable indication is obtained of the state of wear of the sealing. Due to said indication, the sealing can be replaced during the next scheduled standstill. It is obvious that when the weakened part is worn through, the sliding ring is still in a working condition but will start to leak after a time which can be determined on the basis of experience. The weakened part does not affect the total wear nor the total life of the sliding ring.

The invention permits the use of a completely closed indication system, due to which no liquid to be sealed is able to get into the surroundings, although liquid is permitted to drip through the weakened part through the sealing. Liquid which has dripped through is utilized for activating the leak indicator so that, depending of the manner of operation of the indicator, an activation may be carried out by such a small dripped liquid quantity which maybe would not at all be visually noticeable outside the sealing. In addition to instruments which are electrically and mechanically activated due to the action of liquid, also a simple passive collector vessel, in which the leak can be visually noticed, can be used as leak indicator.

Figure 2:
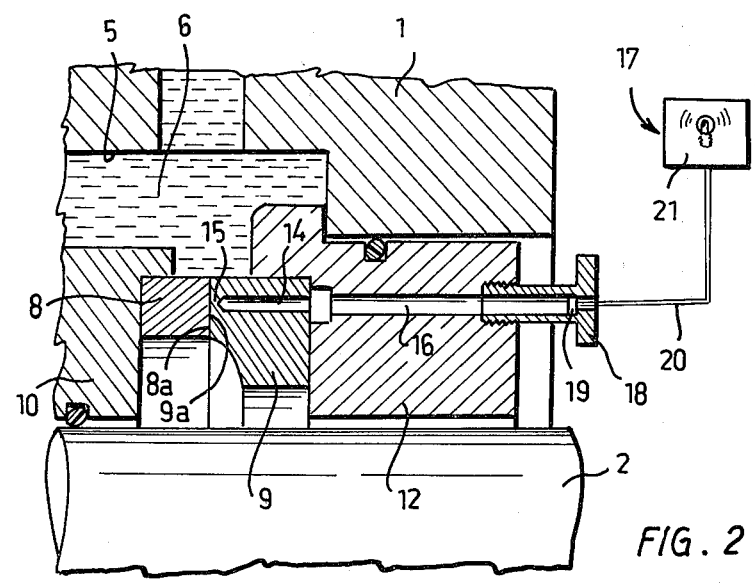
Figure 3:
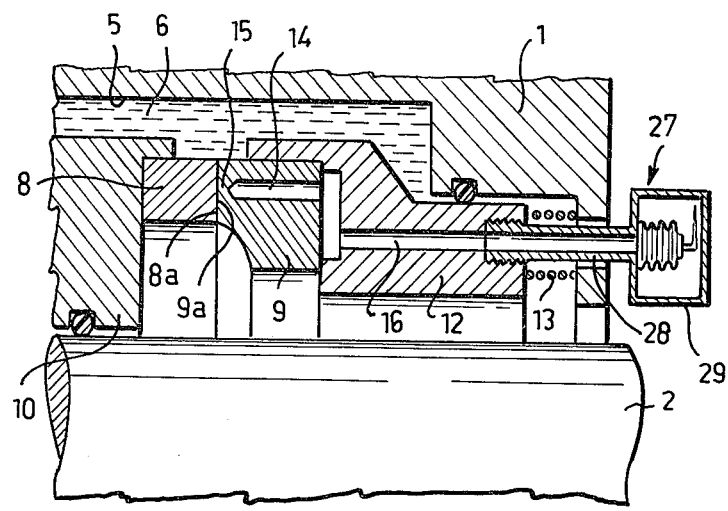
Figure 4:
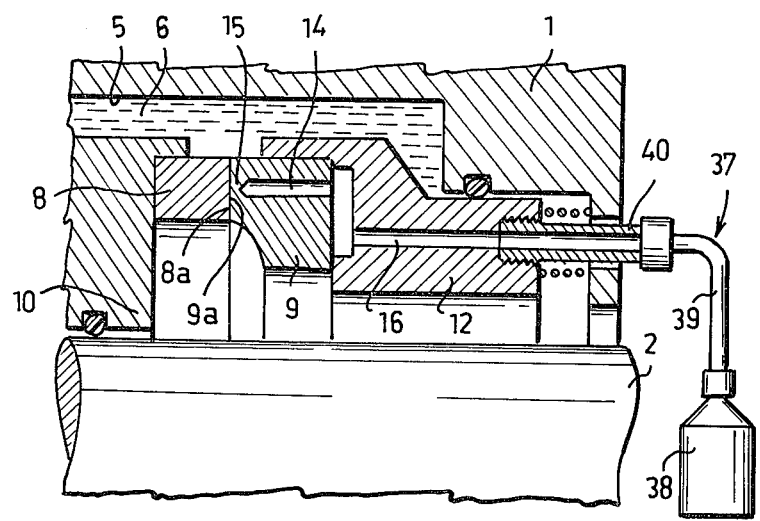

The invention will be described in more detail in the following with reference to the accompanying drawings, in which FIG. 1 is an axial section of a liquid pump provided with a single-acting slide ring sealing according to the invention, FIG. 2 illustrates on an enlarged scale a sealing provided with an electric indicator, FIG. 3 illustrates on an enlarged scale a sealing provided with a mechanical indicator, and FIG. 4 illustrates on an enlarged scale a sealing provided with a collector vessel indicator.

FIG. 1 of the drawing illustrates a rotating shaft 1 and a stationary housing 2 of a liquid pump. The shaft is mounted in said housing by means of bearings (not shown). Reference numeral 3 denotes a pump chamber filled with liquid to be pumped and reference numeral 4 the space outside the pump. A sealing chamber 5 formed in the housing is filled with liquid to be pumped. The sealing chamber is isolated from the outer space by means of a single-acting axial slide ring sealing 7 comprising as main parts a counter ring 8 and a sealing ring 9. The counter ring is mounted in a bearing sleeve 10 fastened by means of a fastening element 11 on the shaft 1 for rotation therewith. The sealing ring is mounted in a support sleeve 12 non-rotatably supported in the housing. The counter ring and the sealing ring are provided with sliding surfaces 8a and 9a, respectively, (FIG. 2) which are pressed against each other under the action of a compression spring 13 provided in the bearing sleeve.

FIG. 2 illustrates in more detail the sealing point itself. In the non-rotating sealing ring 9 is bored a channel 14 from the opposite side with respect to the sliding surface 9a so that the channel ends close to the sliding surface. Thereby a weakened part 15 is formed between the sliding surface and the bottom of the channel. In the support sleeve 12 is formed an axial through-bore 16 which at one end joins the channel in the sealing ring and at the other is connected to a leak indicator 17. The leak indicator comprises a plug 18 which is threaded into the outer end of the bore 16 and which has a recess on the bottom of which is mounted a sensor 19 which is by electric conductors 20 connected to an electrically operating indicator instrument 21.

The slide ring sealing operates in the following manner:

As the pump operates, sliding surface 8a of the support ring 8 rotates against the sliding surface 9a of the sealing ring 9. Liquid to be pumped enters between the sliding surfaces in such an amount that the liquid forms a lubricating film between the sliding surfaces. When the sliding surface of the sealing ring is worn to such an extent that the weakened part 16 is worn through, liquid to be pumped is able to drip through the weakened part into the channel 14 in the sealing ring. The liquid flows from the channel into the bore 16 in the support sleeve and further into the plug 18. When the liquid contacts the sensor 19 in the plug, the sensor sends through the conductors an electric impulse to the indicator instrument 21 which causes a visible or audible alarm or any other kind of indication of the leak that has occurred. The slide ring sealing is not yet at this stage out of working order but can well function until the next scheduled standstill. The indication system according to the invention, however, gives an advance notice that the sealing is worn to such an extent that it should be replaced during the next standstill.

FIG. 3 illustrates an embodiment which can be used when the sealing cannot be connected to an electric follow-up. The indicator 27 in this case comprises a mechanical pressure gauge 29 fastened to the plug 18. When liquid enters the plug through the weakened part 15, the channel 14 and the bore 16, the reading of the pressure gauge changes. This immediately indicates that the weakened part is worn through and the sealing must be replaced during the next standstill.

FIG. 4 illustrates a simple embodiment, in which the indicator 37 comprises a closed, pressure-tight transparent vessel 38 which is by means of a hose 39 connected to a plug 40 secured in the bore 16 of the support sleeve. Liquid which has flown through the weakened part 15 into the vessel can be noticed visually, which indicates that the weakened part is worn through and the sealing must be replaced.

The drawings and the description related thereto are only intended to illustrate the idea of the invention. In its details, the sealing according to the invention may vary considerably within the scope of the claims.

What I claim is:

1. A single-acting slide ring sealing comprising
   a counter ring (8) to be fastened to a rotating machine part (2) and having a first annular sliding surface (8a), and
   a non-rotating sealing ring (9) to be supported on a stationary machine part (1) and having a second annular sliding surface (9a) which, in operation, is pressed against the sliding surface of said counter ring, characterized in
   that the sliding surface (9a) of the sealing ring (9) is provided with at least one part (15) weaker than the rest of the sliding surface, and
   that the sealing ring (9) is provided with a closed channel (14) which is separated by said weaker part (15) from the sliding surface (9a) and which communicates with a leak indicator (17;27;37) acting by means of the liquid to be sealed.

2. A sealing according to claim 1, characterized in that a channel (14) is bored in the sealing ring (9) from the opposite side with respect to the sliding surface (9a), said channel ending close to said sliding surface, whereby the part between the sliding surface and the bottom of the channel forms said weakened part (15).

3. A sealing according to claim 2, characterized in that the leak indicator (17) is an electric indicator, alarm or similar (21) comprising a sensor (19) which is mounted in flow connection with said channel (14) and which, under the action of the liquid, activates the indicator.

4. A sealing according to claim 2, characterized in that the leak indicator (27) is a mechanical pressure gauge (29) mounted in flow connection with said channel (14) so that the liquid pressure causes a change in the pressure gauge reading.

5. A sealing according to claim 2, characterized in that the leak indicator (37) is a collector vessel (38) mounted in flow communication with said channel (14) so that collection of liquid into the vessel causes a visible change in the vessel.

6. A sealing according to claim 3, in which the sealing ring (9) is mounted in an axial support sleeve (12), characterized in that the support sleeve (12) is provided with an axial through-bore (16) which at one end joins the channel (14) in the sealing rind and at the other end is provided with means (18; 28; 40) for connecting the flow indicator (17;27;37).

* * * * *